United States Patent [19]
Sasson

[11] 3,801,193
[45] Apr. 2, 1974

[54] PROJECTOR AND FILM CARTRIDGE THEREFOR

[76] Inventor: Shemtov Sasson, Rabenu Tam 11, Tel Aviv, Israel

[22] Filed: Jan. 17, 1973

[21] Appl. No.: 324,486

[30] Foreign Application Priority Data
Aug. 22, 1972  Israel.................................. 040175

[52] U.S. Cl.................... 352/72, 352/78 R, 352/198
[51] Int. Cl............................................ G03h 23/02
[58] Field of Search............. 352/138, 78 R, 72, 73, 352/74, 75, 76, 77, 198, 203, 129; 95/31 EL; 353/29, 43, 85, 122, 121

[56] References Cited
UNITED STATES PATENTS

| | | | |
|---|---|---|---|
| 3,305,296 | 2/1967 | Nicosia | 352/78 R |
| 3,597,058 | 8/1971 | Nicosia | 352/72 |
| 2,616,332 | 11/1952 | Sorkin | 353/43 |
| 2,404,938 | 10/1968 | Kubnick et al. | 352/242 X |
| 3,074,311 | 1/1963 | Kapilow | 352/129 |
| 3,592,535 | 7/1971 | Gerry | 352/72 |
| 3,667,837 | 6/1972 | Agrati et al. | 352/242 |
| 3,589,803 | 6/1971 | Bouma | 352/72 |
| 1,911,845 | 5/1933 | Owens | 352/138 |
| 2,213,768 | 9/1940 | Merriman et al. | 95/31 EL |
| 2,390,922 | 12/1945 | Coleman | 352/242 X |

*Primary Examiner*—Samuel S. Matthews
*Assistant Examiner*—Alan Mathews
*Attorney, Agent, or Firm*—Philip G. Hilbert

[57] ABSTRACT

A film projector and film cartridge therefor in which the projector comprises a housing having a front portion and a side forming portion in which the width of the front portion is greater than the width of the side forming portion. A film cartridge containing a strip of film is arranged to be detachably secured to the side forming portion of the projector and to complement the projector housing. A projecting lens is mounted on the front portion of the housing so as to be disposed in the front of the film cartridge; and the film cartridge is provided with an aperture and an associated illuminating bulb to provide the required illumination for projecting the images on the film. The cartridge includes contacts for energizing the illuminating bulb and the film feed mechanism of the projector when the cartridge is detachably secured to the side forming portion of the projector housing.

9 Claims, 8 Drawing Figures

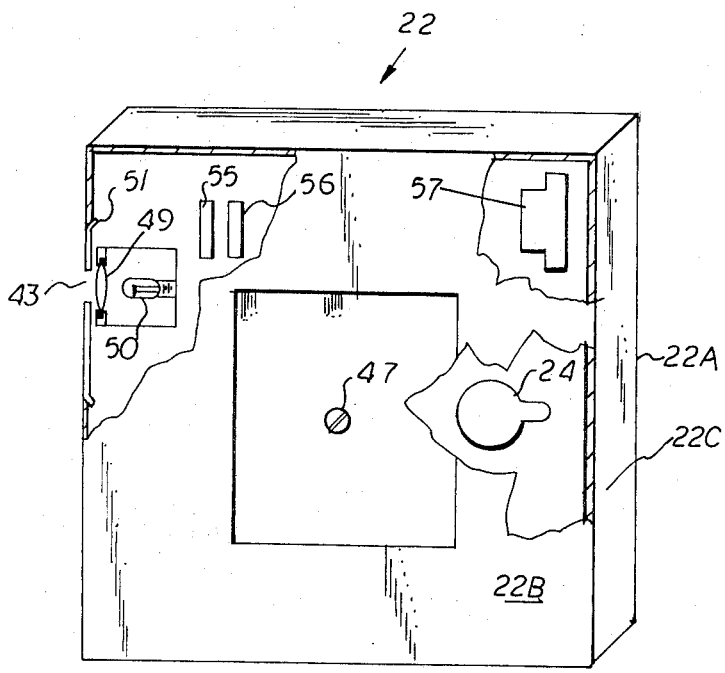
FIG. 4
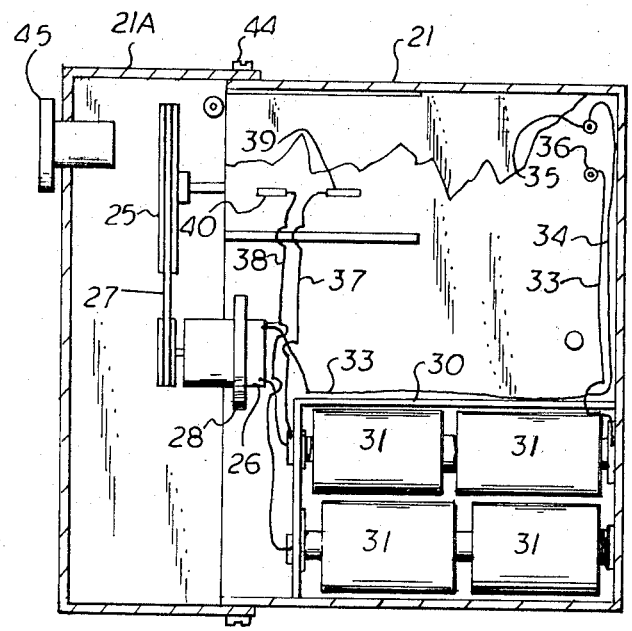
FIG. 5
FIG. 6

PROJECTOR AND FILM CARTRIDGE THEREFOR

OBJECTS

An object of this invention is to provide a projector and film cartridge therefor in which the cartridge is arranged to complement the body or housing of the projector and which is detachably secured to the housing.

Another object of this invention is to provide a projector and a film cartridge therefor in which the illumination required for projection of the film images is contained in the film cartridge.

Another object of this invention is to provide a projector and a film cartridge which is rendered operative only when the film cartridge is properly connected to the projector housing.

Another object is to provide a projector and film cartridge combination in which the cartridge completes the configuration of the projector housing.

Another object is to provide a film cartridge adapted to contain a film strip and the illumination bulb required for projecting the images of the associated film strip.

Another object of the invention is to provide an electrically operated projector and a film cartridge therefor in which the film cartridge and projector have complementary circuit making contacts which renders the projector operative only when the film cartridge is properly attached thereto.

BRIEF SUMMARY OF THE INVENTION

The foregoing objects and other features and advantages of this invention are attained by a film projector having a projector housing which together with a complementary film cartridge is arranged to form a rectangular box shape. The projector housing includes a front forming portion and a side forming portion in which the front forming portion is wider than the side forming portion. The front portion of the projector housing contains a projector lens and associated shutter means disposed thereon so as to be positioned in front of the film cartridge when the film cartridge is attached to the projector housing. A motor means is mounted in the projector housing and is connected in driving relationship to the shutter. The motor is connected to a source of an electrical energy as for example a battery source, which is disposed within the side forming portion of the housing. The front of the housing contains the film feeding mechanism.

A film cartridge adapted to complement the side forming portion of the projector housing includes a casing containing an endless strip of film. The front of the casing is provided with an aperture through which the film images are projected. Operatively associated with the aperture and contained within the film casing is an illuminating bulb for providing the illumination for projecting the images of the film strip during the operation of the projector. The cartridge is also provided with electrical contacts operatively connected to the illuminating bulb which complement contacts on the projector housing which are operatively connected to the motor means and electrical power source contained therein, with the arrangement being such that the projector is rendered operative only when the film cartridge is properly attached to the side of the projector housing. Complementary fastening means are provided on the casing and projector housing for detachably securing the casing to the side forming portion of the projector housing.

FEATURES

A feature of this invention resides in an electrically operated film projector and film cartridge therefor which is rendered operative only when the film cartridge is attached to the camera housing.

Another feature of this invention resides in a film cartridge in which the illumination is contained within the film cartridge.

Another feature of this invention resides in a film projector and film cartridge wherein the film cartridge is constructed and arranged so as to complement the projector body so that the projector body and film cartridge together provide for a compact rectangular box shape.

Another feature of this invention resides in the provision that the film cartridge contains an endless strip of film, the illuminating bulb required for effecting the projection thereof, and vent opening for venting the cartridge.

FIG. 4 is a perspective view of the film cartridge with portions thereof broken away;

FIG. 5 is a side sectional view of the projector with portions thereof broken away FIG. 6 is a front view of the projector and film cartridge with the front cover removed;

DESCRIPTION OF THE PREFERRED EMBODIMENT

Figure 1:
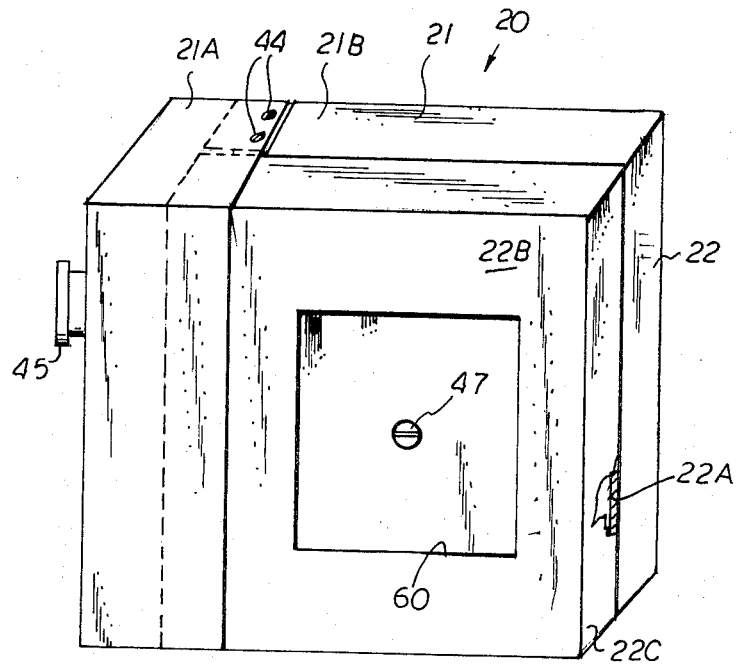
FIG. 1 is a perspective side view illustrating the projector and film cartridge therefor embodying the invention.
Figure 2:
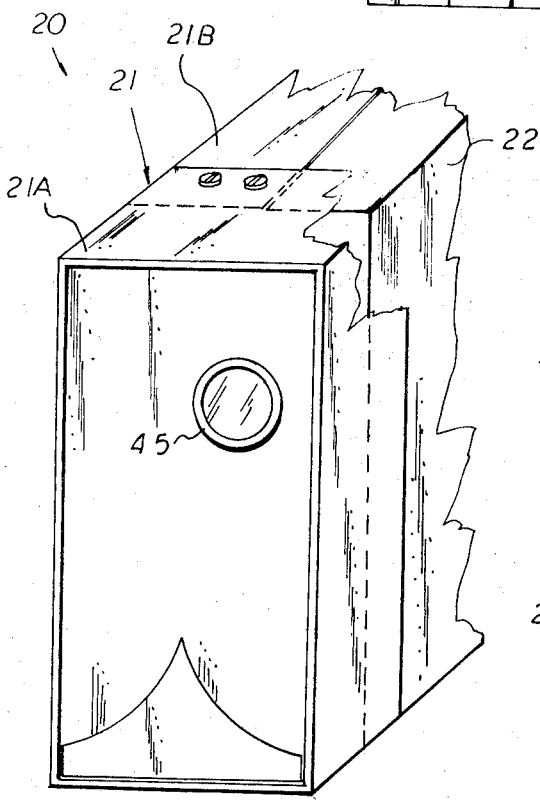
FIG. 2 is a fragmentary perspective front view of the projector of FIG. 1.

Referring to the drawings there is shown a projector embodying the invention and which is capable of projecting, for example, 8 or 16 mm film. The projector, as seen in FIG. 1, comprises a projector housing which includes a front forming or cover portion 21 A and a side forming portion 22 B. As best seen in FIG. 1 and FIG. 2, the front forming or cover portion 21 A has a width which is greater than the side forming portions 21 B so as to accommodate both the side forming portions 21 B and film cartridge or cassette 22 as will be hereinafter described. The configuration of the projector housing together with the film cartridge is that of a rectangular or box-like form. The size and shape of the projector housing 21 B and associated film cartridge 22 is such that they complement each other to define a substantially rectangular boxlike configuration. As will be hereinafter described, complementary fastening means 23, 24 are provided for detachably securing the film catridge 22 to the side forming portion 21 B of the projector 20 so that the cartridge 22 may be readily attached or removed from the housing 21 B.

On the front end of the projector housing 21B, as best seen in FIG. 6, there is rotatably mounted thereon a shutter wheel 25 having appropriate cut-out portions 25A. The shutter wheel 25 is driven by an electric motor 26 through a belt drive 27. As best seen in FIG. 5, the motor 26 is suitably supported in a motor mount 28 in the side forming portion 21B of the projector housing 20. In the illustrated form of the invention the source of electrical energy for operating the motor 26 comprises a battery source 29. A battery holder or compartment 30 is disposed in the side forming portion 21B of the projector housing and it is arranged to accommodate one or more batteries 31 connected in series. The battery terminals are appropriately connected in circuit to the motor terminals by suitable wire conductors 33, 34 and to motor switch contacts 35, 36. The battery terminals are also connected in circuit by wire conductors 37 and 38 to a pair of bulb switch contacts 39, 40. It will be understood that operatively associated with the shutter wheel 25 is a film feed mechanism, as for example, a griffi, and associated claw 42, which when actuated will function to effect the feeding of a film strip past an aperture 43 formed in an end wall portion of the film cartridge 22. The front of the housing section 21B is encased by a front forming portion or cover 21A which may be suitably secured to the portion 21B by a suitable fastener means, as for example, screws 44. Disposed on the cover 21A is a projecting lens 45. As best seen in FIGS. 1 and 2 the projecting lens 45 is disposed to the side portion disposed in alignment with the aperture 43 of the film cartridge.

Figure 3:
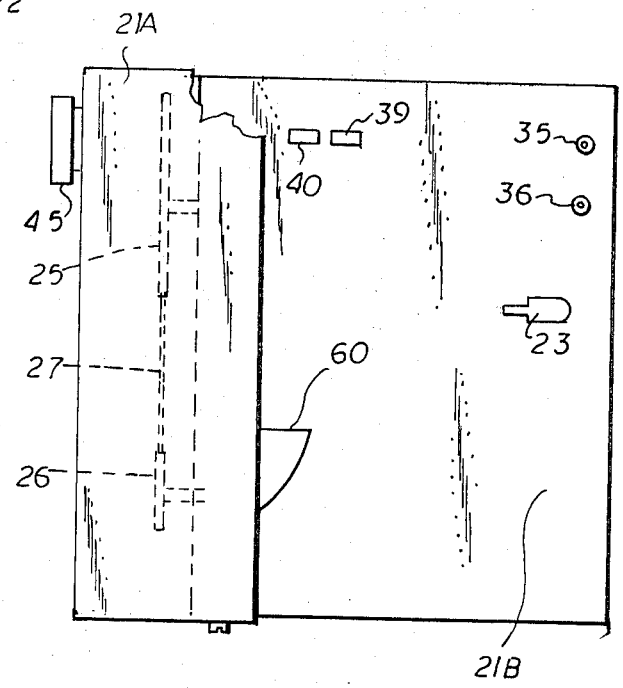
FIG. 3 is a side elevational view of the projector housing with the film cartridge removed.
Figure 7:
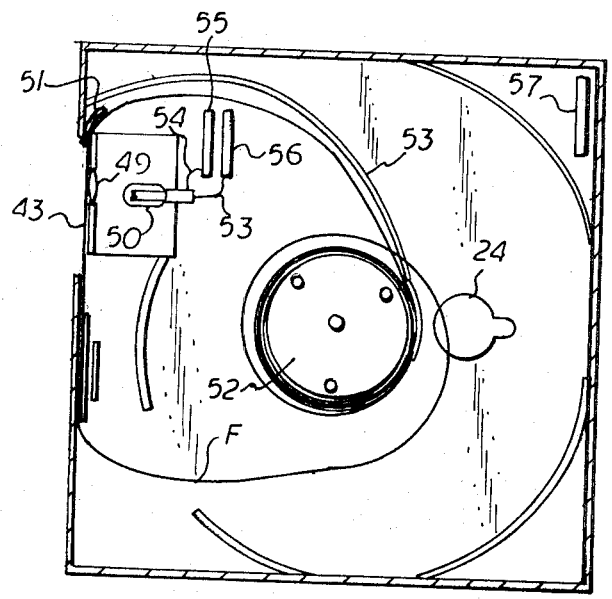
FIG. 7 is a sectional view of the film cartridge with the cover plate removed.
Figure 8:
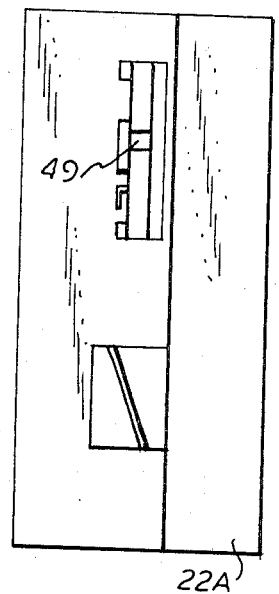
FIG. 8 is a rear view of the projector housing with the film cartridge removed.

As best seen in FIG. 3 the inner side wall portion of the projector housing portion 21B is provided with a key 23 for releasably securing the film cartridge 22 thereto.

As best seen in FIG. 4 the film cartridge 22 comprises a casing defined by a back casing section 22A and a cover section 22B. The respective casing sections 22A, 22B are secured by a suitable screw fastener 47. The circumscribing end wall 22C of the casing is provided with an aperture 43 which is adapted to be disposed in alignment with the projecting lens 45 when a casing or cartridge 22 is secured to the housing 21A. Operatively associated with the aperture is an optical lens 49. Positioned behind the lens 49 within the film cartridge is a light bulb 50. Ahead of lens 49 is the film gate 51 through which the film strip F is advanced during projection. Preferably the film strip F is defined as an endless film strip which is threaded through the gate 51 and around a center hub 52 to define an endless loop, and that suitable film guides 53 may be interposed in the film cartridge 22 to guide the film during operation.

The terminals of the bulb 45 are wired by suitable conductors 53, 54 to a pair of bulb contacts 55, 56 which project to the outer surface of the casing 22. The casing is also provided on the outer surface thereof, with a second contact or motor switch contact 57, which in operation is adapted to bridge the motor contacts 35, 36 exposed on the side wall portion 21B of the projector housing 21.

Also the back wall 22A of casing 22 of the film cassette or cartridge has a key-shaped hole 24 adapted to complement the key 23 formed on the side wall portion of the projector housing 21B. The arrangement of the key 23 and complementary keyhole 24 is such that the film cartridge can be readily attached and secured to the projector housing simply be positioning the cartridge 22 against the side wall portion 21B of the housing and with slight force slip the front end of the cartridge 22 into the front cover 21A whereby the key 23 latches onto the keyhole 24 to secure the film cartridge in place to the side wall portion of the projector portion 21B.

With the film cartridge 22 in position against the side wall of the projector housing 21B, it will be noted that the contacts 55, 56 exposed on the outer surface of the film cartridge will engage the contacts 35, 36 on the projector housing 21B so as to connect the light bulb 50 in circuit with the source of electrical power, as for example, the batteries 31, thereby causing the light bulb 50 to be energized. Also the positioning of the cartridge 22 against the side wall of the projector housing 21B causes contact 57 thereon to bridge the motor contacts 35 and 36, causing the motor to be energized. The arrangement is such that the illuminating bulb 50 carried within the film cartridge 22, and the motor for operating the shutter and the film feed mechanism are rendered operative only when the film cartridge 22 is properly secured to the side wall portion 21B of the projector housing. Projecting of the images of the film strip F occurs immediately upon the attachment of the film cartridge 22 to the projector housing 21B. In order to effect a venting of the film cartridge 22 to dissipate the heat of the bulb 50, a suitable vent opening may be formed in the casing 22 which complements a corresponding vent opening 60 formed in the projector housing.

In the illustrated form of the invention the outer wall portion or cover 22B of the film cartridge 22 is provided with a depression 61 which will facilitate the handling thereof and will function as an indication as to which side of the film cartridge defines the exterior portion of the cartridge.

From the foregoing it will be noted that a readily compact projector assembly is provided wherein the film cartridge 22 complements the projector housing 21B so as to form in combination a compact box-like shape. Also the illuminating bulb 50 required for illumination in projecting the film images is wholly contained within the film cartridge 22 and is energized only when the film cartridge 22 is properly positioned onto the projector housing and the motor 26 for operating the film drive mechanism and shutter being operative also only by proper attachment of the cartridge 22 to housing 21B.

While the projector has been described as containing a battery source of power, it will be understood that the motor may alternately powered by conventional household current and/or may be, by suitable rectifying means, operatively operated on either A/C or D/C current supply.

As the foregoing invention has been described with respect to a particular embodiment thereof, it will be understood that other variations and modifications may be made without departing from the spirit or scope of the invention.

What is claimed is:

1. A projector and film cartridge combination comprising:
   a housing having a front end portion and a complementary side wall portion,
   a projecting lens and associated shutter mounted on the front end portion of said housing,
   a film feed means adjacent said shutter,
   a film guide disposed adjacent said film feed means, and a film cartridge detachably connected to said complementary side wall, said cartridge including a film strip disposed thereon, and said cartridge containing a lens opening and associated light bulb adapted to provide illumination for projecting the images on said film strips when said film cartridge is attached to said projector housing, drive means operating said shutter and film feed means, and complementary means connected to said projector housing and said film cartridge for activating said drive means and energizing said bulb when said cartridge is connected to said complementary wall of said housing.

2. The invention as defined in claim 1 wherein said cartridge includes an endless film strip.

3. The invention as defined in claim 1 wherein said cartridge and complementary side wall of said housing have complementary means for detachably securing said cartridge to said side wall.

4. The invention as defined in claim 1 and including venting means formed in said cartridge for venting said cartridge.

5. The invention as defined in claim 1 wherein said drive means comprises:

an electric motor, a source of electrical energy disposed in said projector housing, and a circuit connecting said motor to said source of electrical energy, and a circuit connecting said bulb to said source of electrical energy, said circuit being activated by said complementary means on said housing and said cartridge only when said cartridge is secured to said housing.

6. The invention as defined in claim 5 wherein said shutter comprises an apertured shutter wheel, and a flexible driving belt connecting said motor in driving relationship with said shutter wheel.

7. A film cassette adapted for use with a film projector comprising:

a film casing adapted to contain a film strip therein, an aperture formed in a wall portion of said film casing through which the image in the film strip is projected, a light bulb disposed in said film casing adjacent said aperture to provide for illumination when projecting the images on the film strip, and including electrical contacts located in an external wall portion of said film casing, said electrical contacts being electrically connected to said bulb.

8. The invention as defined in claim 7 and including a second contact means located on an external wall portion of said casing.

9. A projector and film cartridge combination comprising:

a projector housing having a side forming portion and a front forming portion, said front forming portion having a width greater than side forming portion, a projecting lens mounted on said front forming portion so as to be disposed to one side of side forming portion, a shutter wheel rotatably journalled on said front forming portion, a motor mounted on said side forming portion adjacent said front forming portion, a flexible drive connecting said motor in driving relationship with said shutter wheel, a film feed means operatively associated with said shutter wheel, a source of electrical energy disposed in the side forming portion of said housing, a pair of contacts mounted on the side forming portion of said housing, said pair of contact being wired in circuit with said motor and said source of electrical energy whereby said contacts are spaced to define an open circuit to said motor means, a second pair of electrical contacts wired in series with said source of electrical energy to define a second open circuit, a film cartridge comprising a casing adapted to contain a film strip, said casing having an aperture through which the images on said film strip are projected, a light bulb to provide the illumination for the projection of the film strip, complementary means for detachably securing said film cartridge to the side wall forming portion of said housing, a contact located on said casing for bridging said first mentioned pair of contacts to close the circuit to said motor when the film cartridge is secured to said housing, and second contact means on said film cartridge for engaging said second pair of contacts on said housing, said second contact means being electrically connected to said light bulb whereby said light bulb is energized when said cartridge is secured to said housing, and means for venting said cartridge.

* * * * *